United States Patent [19]

Morgan et al.

[11] Patent Number: 5,245,556
[45] Date of Patent: Sep. 14, 1993

[54] ADAPTIVE EQUALIZER METHOD AND APPARATUS

[75] Inventors: Jason N. Morgan; Harold A. Vaghy, both of Huntsville, Ala.

[73] Assignee: Universal Data Systems, Inc., Huntsville, Ala.

[21] Appl. No.: 945,081

[22] Filed: Sep. 15, 1992

[51] Int. Cl.$^5$ ............................................. G06J 1/00
[52] U.S. Cl. ................................................... 364/602
[58] Field of Search ............... 364/602, 825, 724.19, 364/724.2; 333/18, 28 R; 375/14, 11, 12, 15

[56] References Cited

U.S. PATENT DOCUMENTS 4,456,893  6/1984  Otani ............................ 333/18
4,803,895 12/1981  Ohnishi et al. ................. 333/18
5,068,873 11/1991  Murakami ...................... 375/13

Primary Examiner—Tan V. Mai
Attorney, Agent, or Firm—Wayne J. Egan

[57] ABSTRACT

An equalizer is arranged for equalizing a received signal comprising 2-binary, 1-quaternary-coded multi-level signals S(−3), S(−1), S(+1), S(+3) corresponding to predetermined signal levels −3, −1, +1, +3, respectively. The equalizer includes a gain unit (107) with an adjustable gain, a filter (111) with an adjustable pole and zero, and a processor (119). The processor adjusts the equalizer by sampling equalized S(+3) signals and adjusting the gain, the pole and the zero so that the average value of the equalized S(+3) signals is substantially equal to +3 volts and the variance of the equalized S(+3) signals is minimized.

28 Claims, 6 Drawing Sheets

ADAPTIVE EQUALIZER METHOD AND APPARATUS

FIELD OF THE INVENTION

This application relates to equalizers including, but not limited to, an adaptive equalizer method and apparatus.

BACKGROUND OF THE INVENTION

As is known, some digital data service (hereinafter "DDS") receivers are arranged to receive a 2-binary, 1-quaternary (hereinafter "2B1Q")-coded signal. The 2B1Q signal is a 4-level signal, with allowed signal levels of $+3$ volts (corresponding to a logical value of 10), $+1$ volts (corresponding to a logical value of 11), $-1$ volts (corresponding to a logical value of 01), and $-3$ volts (corresponding to a logical value of 00).

As is known, typically the 2B1Q-coded DDS signal is distorted by the telephone line providing the signal to the receiver. The distortion is caused by the capacitance of the telephone line acting to smooth-out and round-off the multi-level pulses, thus causing time delay, phase delay, and attenuation of the voltage levels.

To allow operation over long ranges, therefore, this distortion must be corrected. As a result, an equalizer is needed to boost the signal level and remove the frequency and phase error.

DESCRIPTION OF THE PREFERRED EMBODIMENT

Briefly, an adaptive equalizer method and apparatus, in accordance with the present invention, utilizes an adjustable gain unit with an independently-adjustable gain value, and an adjustable filter unit with independently-adjustable pole and zero values in order to optimize the received signal amplitude and minimize the received signal variance at the center of each received 2B1Q signal pulse, or "baud."

As above, the received 2B1Q signal includes a multiplicity of predetermined signals $S(-3)$, $S(-1)$, $S(+1)$, and $S(+3)$ corresponding to predetermined signal levels $-3$, $-1$, $+1$, $+3$, respectively. One signal level is chosen as a reference level and the received signals corresponding to this level are then sampled. In what follows, it is assumed the $+3$ level is chosen as the reference level and thus the $S(+3)$ signals are sampled. The received signal is then equalized such that the average of the received equalized $S(+3)$ signals is substantially equal to $+3$ volts. The received signal is then further equalized to minimize the variance of the received equalized $S(+3)$ signals.

Figure 1:
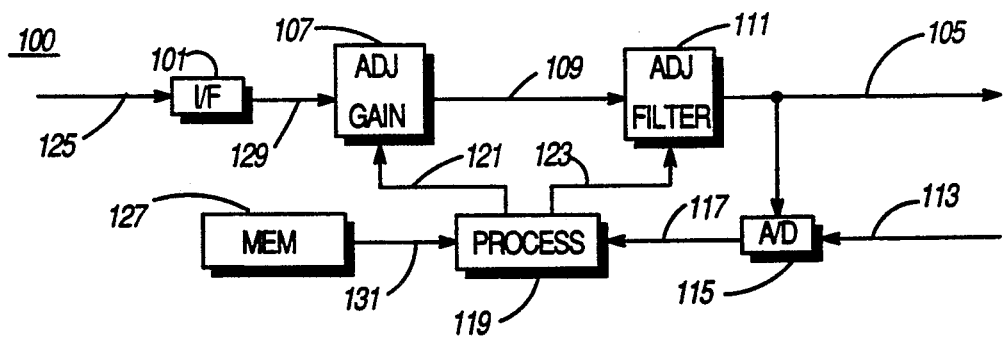
FIG. 1 shows a receiver that is suitable for demonstrating a first embodiment of an adaptive equalizer method and apparatus, in accordance with the present invention.

Referring to FIG. 1, there is shown a DDS receiver 100 that is suitable for demonstrating a first embodiment of an adaptive equalizer method and apparatus, in accordance with the present invention.

As shown, a signal 129 is received from a telephone line 125 via a line interface unit 101. The line 125, in turn, is coupled to the serving telephone company facilities (not shown). The line 125 may comprise, for example, from a minimum of zero to a maximum of 4.1 kilometers of 22 gauge, 24 gauge, or 26 gauge copper conductors, or a mixture thereof. The line 125 may therefore vary from a minimum of zero dB to a maximum of 40 dB of loss.

The signal 129 is then equalized by an adjustable gain unit 107 and an adjustable filter unit 111, thus forming an equalized signal 105. The equalized signal 105 forms the input to the receiver logic (not shown). The receiver logic, in turn, derives a clock signal 113 from the equalized signal 105.

The equalized signal 105 and the clock signal 113 are input to an analog-to-digital (hereinafter "A/D") converter 115. It will be understood that the equalized signal 105 will comprise received signals for all levels, namely, $-3$, $-1$, $+1$, $+3$. While any level may be chosen as the reference level, the levels with the greatest voltage magnitude, namely, $-3$ and $+3$, are easier to identify. Thus, one of these is chosen. In what follows, therefore, it is assumed the $+3$ level is chosen as the reference level.

Thus, the circuit 115 scans the equalized signal 105 and detects $S(+3)$ signals as needed. These signals are sampled at the center of the baud, thus forming a series of sampled values, which are output on the lead 117. The lead 117, including the sampled values, forms the input to a processor 119. The processor 119, in turn, is arranged to access a memory unit 127 via a lead 131. The memory unit 127 includes stored data including a table comprising a plurality (n) of predetermined entries ($E_k$), where $k = 1, 2, 3, \ldots, n$, each entry $E_k$ comprising a predetermined gain value ($G_k$), a predetermined pole value ($P_k$) and a predetermined zero value ($Z_k$). In one embodiment, the table includes 45 entries; thus, $n = 45$. For $n = 45$, therefore, the table would therefore have the format as described below in TABLE A.

TABLE A

| Entry | Gain Value | Pole Value | Zero Value |
|---|---|---|---|
| $E_1$ | $G_1$ | $P_1$ | $Z_1$ |
| . | . | . | . |
| . | . | . | . |
| . | . | . | . |
| $E_k$ | $G_k$ | $P_k$ | $Z_k$ |
| . | . | . | . |
| . | . | . | . |
| . | . | . | . |
| $E_{45}$ | $G_{45}$ | $P_{45}$ | $Z_{45}$ |

It will be appreciated that the equalizing performance ultimately achieved will directly depend on the number of entries contained in the look-up table. Thus, more entries equates to improved performance.

It will further be appreciated that, for a given level of performance, the number of entries required in the look-up table will depend on the dynamic range of transmission lines 125 that are required to be equalized. Thus, if the dB variation in the line 125 is small say, for example, 5%, then fewer entries will be required. Conversely, if the dB variation in the line 125 is large say, for example, 100%, then a larger number of entries in the look-up table will be required.

In accordance with an adaptive equalizer method and apparatus, in accordance with the present invention, therefore, the processor 119 is programmed to adjust the adjustable gain unit 107 and the adjustable filter unit 111 based on the predetermined signal $S(+3)$ samples 117, the predetermined entries $E_k$ and the process depicted in FIGS. 2-8.

In one embodiment, therefore, an adaptive equalizer, in accordance with the present invention, includes an adjustable gain unit 107 having a gain that may be adjusted and an adjustable filter unit 111 having a pole that may be adjusted and a zero that may be adjusted, the adjustable gain unit 107 and the adjustable filter unit 111 arranged for equalizing a set of received signals including a predetermined signal S(+3) applied to the input lead 129 and for forming an equalized signal at the output lead 105, and a processor 119 arranged to adjust the gain, the pole, and the zero based on the average value and the variance of the equalized predetermined signals S(+3) output on the lead 105.

Moreover, in one embodiment, the adjustable gain unit 107 may be fabricated, for example, using a multiplying digital to analog (hereinafter "D/A") converter, as controlled by the lead 121, connected in series with an operational amplifier. In this embodiment, the input lead 129 is used as the reference voltage of the multiplying D/A converter. The output of the multiplying D/A converter is then buffered using the operational amplifier connected in series to provide the signal at the lead 109. The multiplication factor, or gain, of the multiplying D/A converter is controlled by the lead 121.

Also, in one embodiment, the adjustable filter 111 is fabricated, for example, using an operational amplifier arranged with adjustable pole and zero elements which, in turn, are controlled by one or more digital potentiometers, as controlled by the lead 123.

The adjustable gain unit 107, the adjustable filter unit 111 and the processor 119 thus act in concert to provide a transfer function which approximates the inverse of the transfer function of the line 125. Since individual lines differ because of length or type of make-up, the frequency response and gain of the equalizer is adjustable over a wide range. As will be described more fully hereinafter, the processor 119, based on a process as depicted in FIGS. 2-8, acts to optimize the adjustable gain unit 107 and the adjustable filter unit 111 with respect to the average amplitude of the reference +3 level samples and the variance of the amplitude of the reference +3 level samples.

Figure 2:
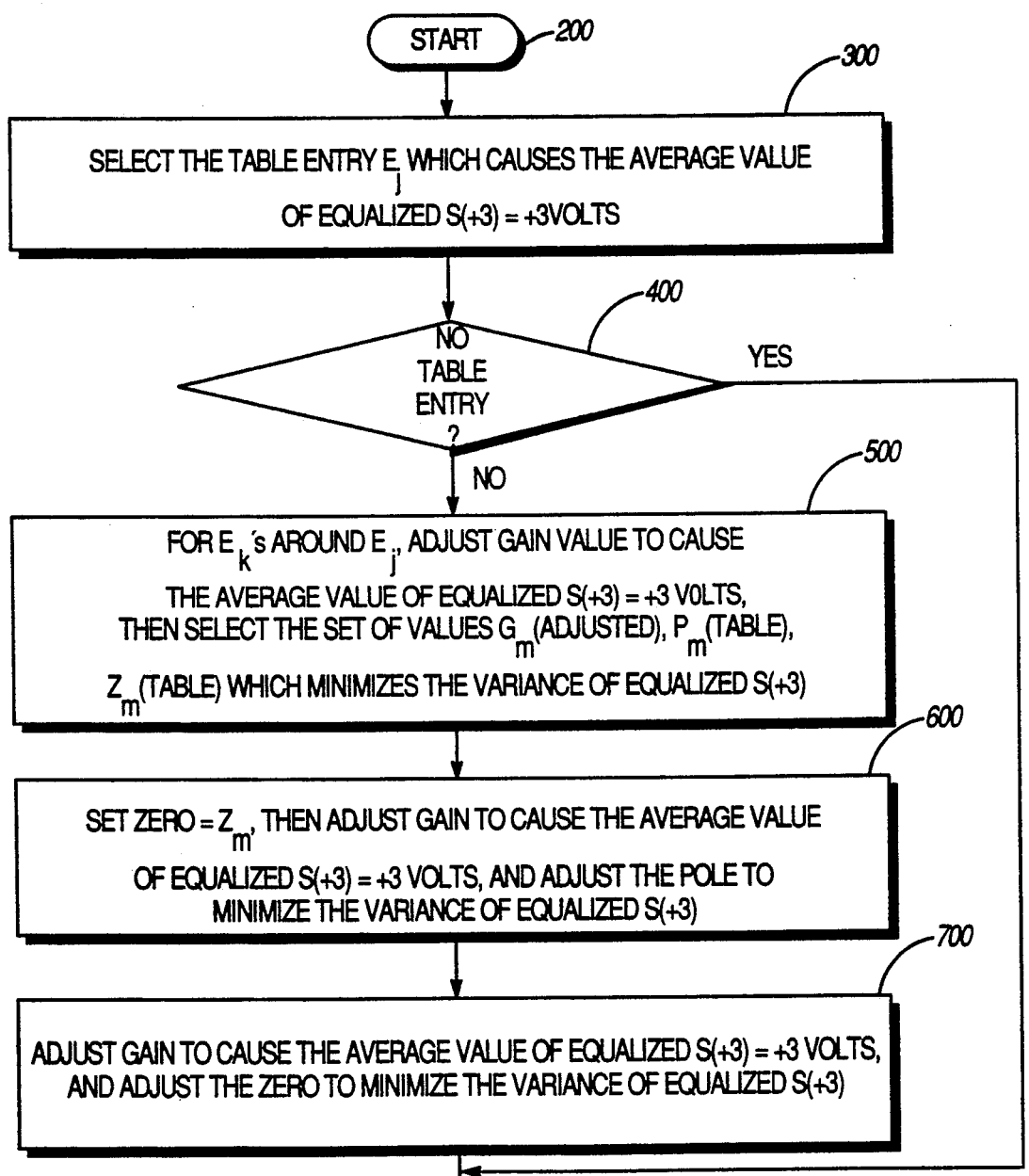
FIGS. 2-7 are flow diagrams for the first embodiment.

Referring to FIG. 2 there is shown a first flow diagram 200 for the processor 119.

The process starts, step 200, and then goes to step 300. In step 300, the processor steps through the look-up table of equalizer settings, $E_k$, as contained in the memory unit 127, and selects the table entry $E_j$ giving approximately the correct average amplitude for the reference level +3 samples, as detected at the equalizer output lead 105. Thus, since the reverence level is +3, then the average value of the +3 samples at signal point 105 should approach this value, namely, +3.0 volts. For each table entry, $E_k$, the adjustable gain circuit 107's gain is adjusted to the corresponding gain value, $G_k$, via lead 121, and the adjustable filter unit 111's pole and zero are adjusted to the corresponding pole value, $P_k$, and zero value, $Z_k$, respectively, via the lead 123, and then the average value of the reference +3 level samples is determined via the A/D unit 115 and the lead 117.

Moreover, in step 300, for each $E_k$, as k varies from 1-n, the process adjusts the gain to the gain value $G_k$, adjusts the pole to the pole value $P_k$, adjusts the zero to the zero value $Z_k$, calculates the average value of the plurality of equalized +3 signals, and then compares the average value to +3. The process then selects the entry $E_j$ which causes the average value of the plurality of equalized +3 signals to substantially equal +3.

The process then goes to step 400, where it determines whether it has failed in step 300 to find a table entry $E_j$ which causes the average value of the equalized +3 levels at the output lead 105 to be +3 volts. There are several reasons why this might happen. For instance, there may be no +3 level signals present in the incoming signal 125. In such a case, equalization is not possible. Thus, if the determination from step 400 is positive (indicating that a suitable $E_j$ has NOT been found in the table), the process goes to step END, where the equalization process is ended. Otherwise, if the determination from step 400 is negative (indicating that a suitable $E_j$ HAS been found in the table), the process goes to step 500, where the equalization process continues.

Moreover, in step 400, the process determines when the plurality (n) of entries $E_k$ does not include an entry $E_j$ which causes the average value of the plurality of equalized +3 signals to substantially equal +3.

In step 500, the process steps through a plurality of entries around $E_j$, and, for each $E_k$, inputs the corresponding $G_k$, $P_k$, and $Z_k$ to the adjustable gain unit 107 and the adjustable filter 111. The process then adjusts the gain value $G_k$ to an adjusted value $G_k'$ which causes the average value of the equalized +3 levels at the output lead 105 to be +3 volts. The process then selects the adjusted value $G_k'$ and the corresponding $P_k$ and $Z_k$ which causes the variance of the equalized +3 levels at the output lead 105 to be minimized. Note the resulting gain value $G_k'$ is calculated by the processor 119, whereas the resulting pole value $P_k$ and zero value $Z_k$ are taken directly from the table.

Moreover, in step 500, for each entry $E_k$ as k varies above and below j, thus . . . , j−2, j−1, j, j+1, j+2, . . . , the process adjusts the pole to the pole value $P_k$, adjusts the zero to the zero value $Z_k$, adjusts the gain to a gain value which causes the average value of the plurality of equalized +3 signals to substantially equal +3, and then calculates the variance of the plurality of equalized +3 signals. The process then selects the set of values $G_m$, $P_m$ and $Z_m$ which causes the variance of the plurality of equalized +3 signals to be minimized.

The process then goes to step 600. In step 600, the process sets the zero to the value $Z_m$ (as determined in step 500), and then adjusts the gain to a value which causes the average value of the equalized +3 signals at the output lead 105 to equal +3 volts, and then adjusts the pole to a pole value which causes the variance of the equalized +3 signals present at the output lead 105 to be minimized.

The process then goes to step 700. In step 700, the process further adjusts the gain to a value which causes the average value of the equalized +3 signals at the output lead 105 to equal +3 volts, and then adjusts the zero to a zero value which causes the variance of the equalized +3 signals present at the output lead 105 to be minimized. The process then goes to step END.

In step END, the equalization process is complete.

Figure 3:
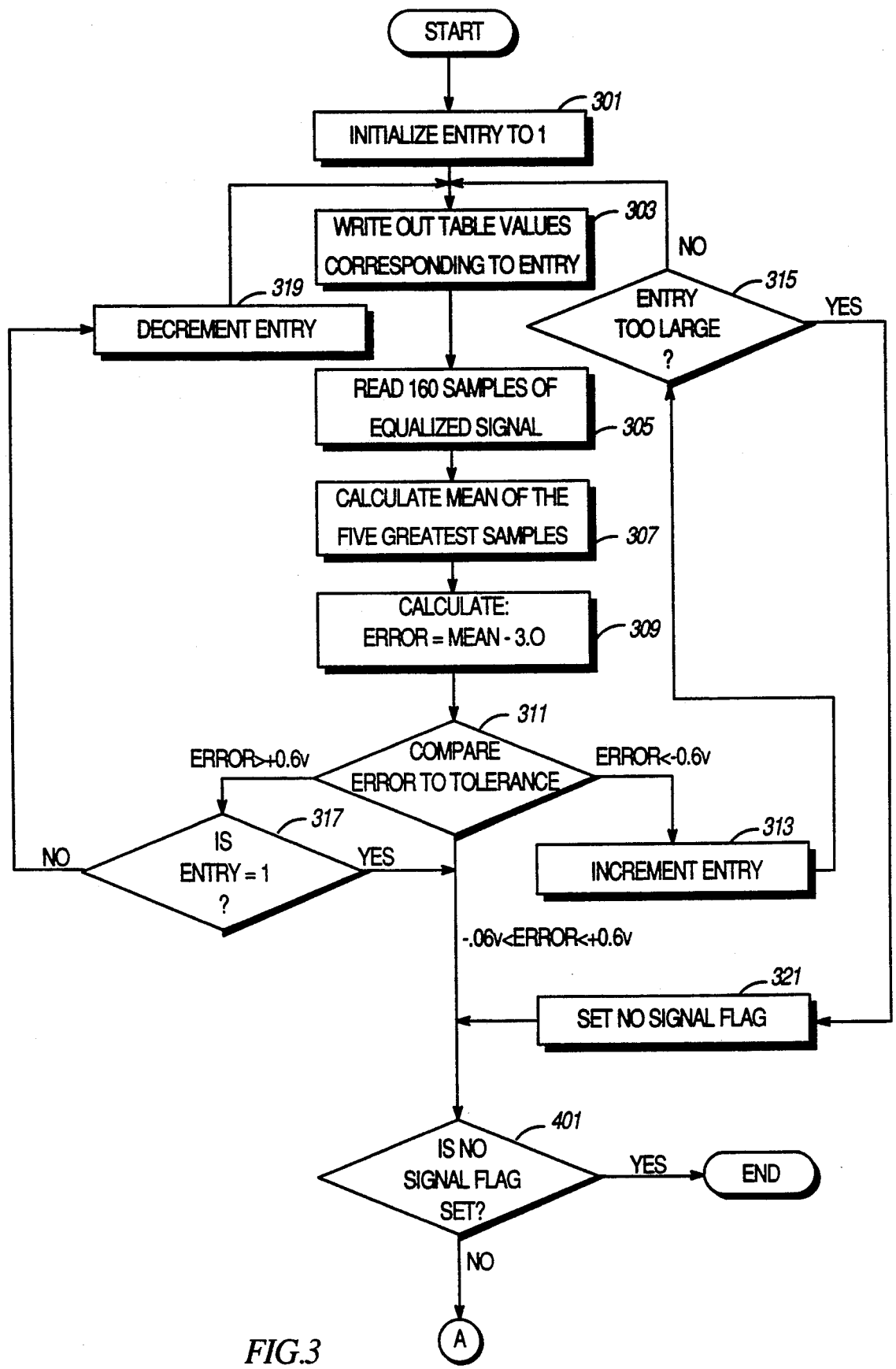

FIG. 3 depicts further detail for steps 300 and 400 (shown in FIG. 2). In FIG. 3, steps 301-321 correspond to step 300 in FIG. 2; also in FIG. 3, step 401 corresponds to step 400 in FIG. 2. In what follows, a variable designated ENTRY is utilized to select the entry $E_k$ from the look-up table. Thus the value of the parameter ENTRY is equivalent to the value of the parameter k, where k = 1, 2, 3, . . . , n.

Referring now to FIG. 3, the process starts by initializing ENTRY to 1. This selects entry $E_1$ from the table. The process next goes to step 303, 305, 307, 309, and 311, in sequence.

In step 303, the process writes the corresponding values $G_1$, $P_1$, and $Z_1$ to the gain unit and the filter unit. In steps 305 and 307, the process samples the output, selects five (5) +3 samples (assuming these are present in the output), and calculates the average value of the +3 samples. In step 309 the process compares the average value to +3.

In step 311, the process whether the average value is greater than a permitted tolerance, or is less than the permitted tolerance, or is within a permitted tolerance of +3.0. If the average value is too large, the process goes to steps 317 and 319, and then repeats steps 303-311. If the average value is too small, the process goes to steps 313 and 315, and then repeats steps 303-311. If the average value is within tolerance, the process goes to step 401.

In this latter case (average value within tolerance), the selected table entry at this point is $E_j$. Hence, the value value of ENTRY=j.

Note the parameter ENTRY is decremented by 1 on step 319. This changes the selected table entry from $E_k$ to $E_{k-1}$. Note the parameter ENTRY is incremented by 1 on step 313. This changes the selected table entry from $E_k$ to $E_{k+1}$.

Note that step 315 determines when the table is exceeded and, as a result, equalization is not possible. In this case, a NO SIGNAL FLAG is set, and the process goes to step 401.

Step 401 determines if the NO SIGNAL FLAG is set. If the determination is positive, the process goes to step END, where the equalization process is complete. Otherwise, the process goes to FIG. 4 via reference letter A.

Figure 4:
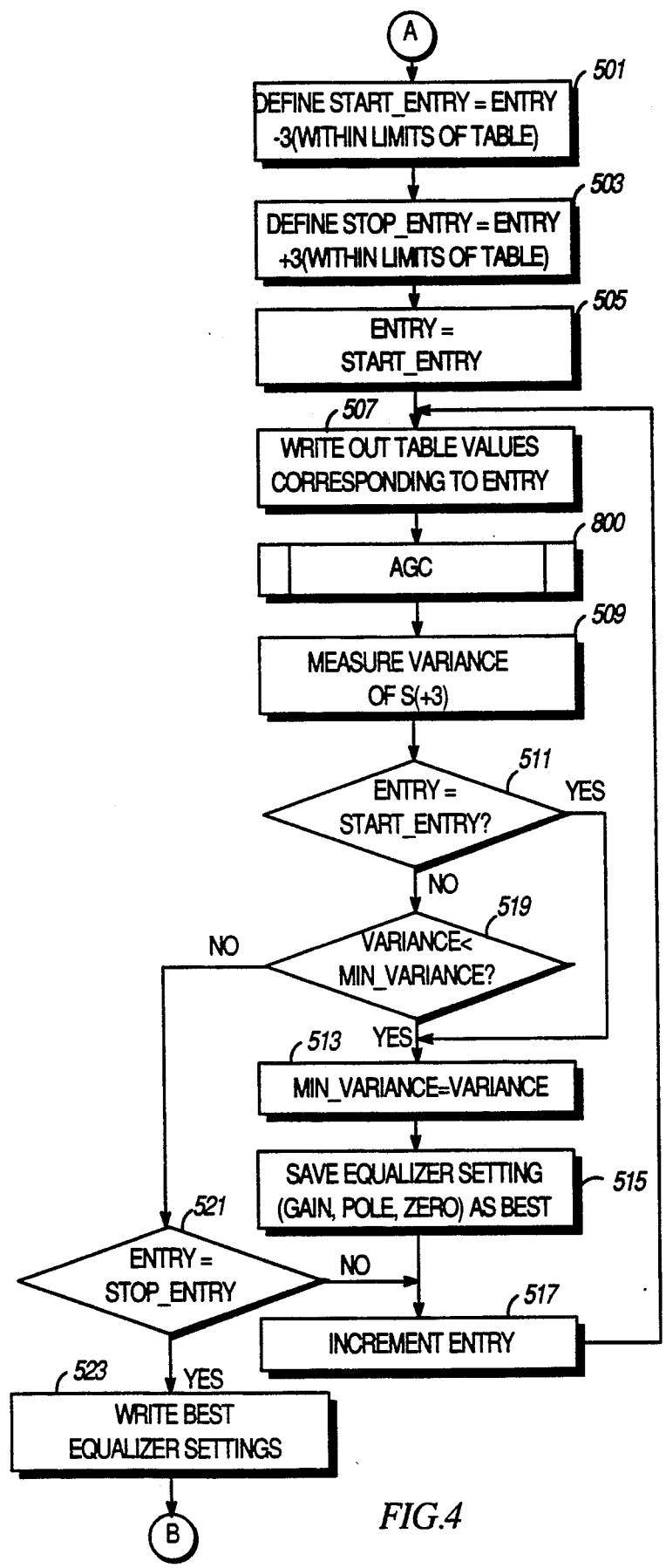
Figure 5:
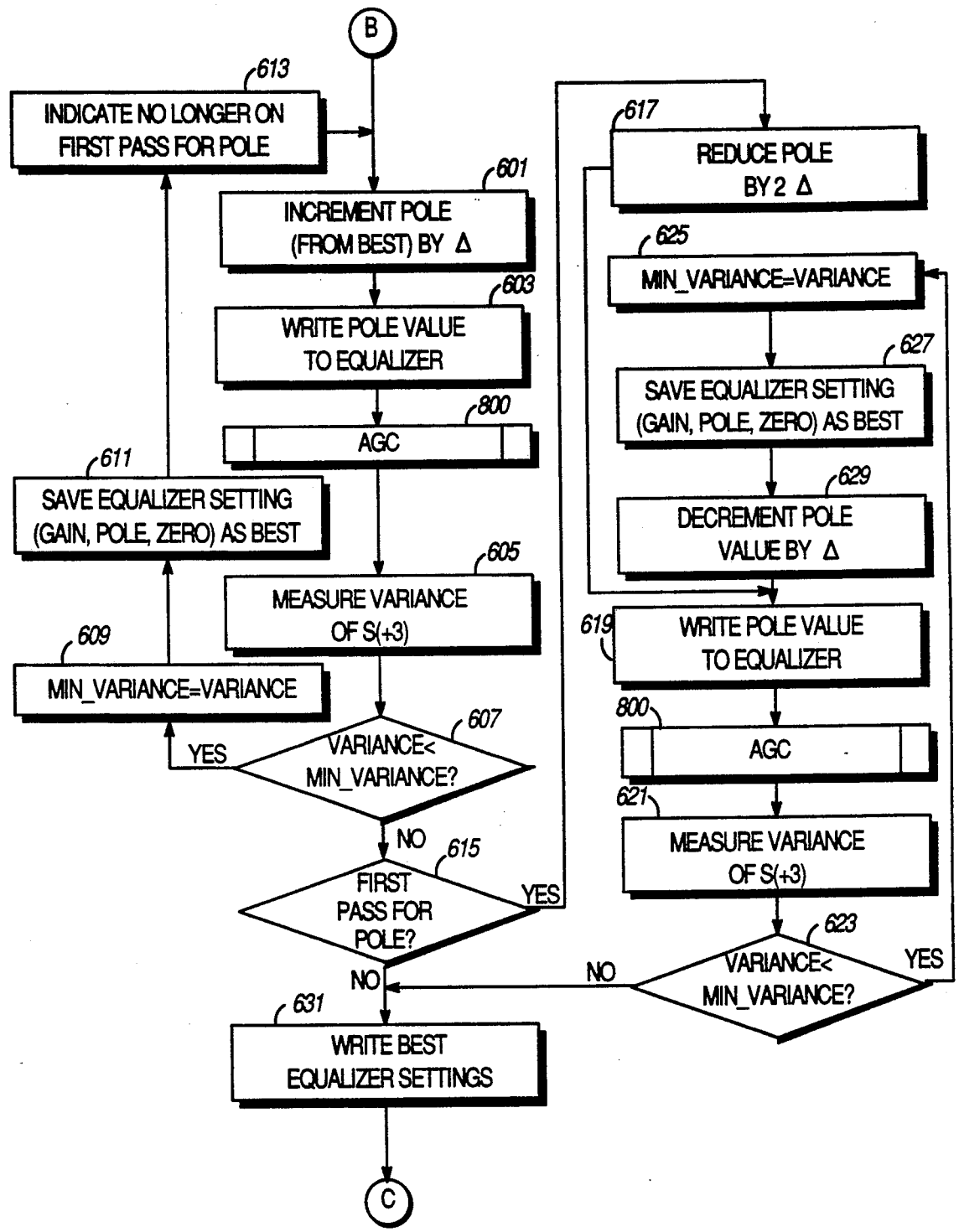

FIG. 4 depicts further detail for step 500 (shown in FIG. 2). Referring now to FIG. 5, steps 501-505 define a plurality of table entries above ("STOP ENTRY") and below ("START ENTRY") the entry $E_j$ selected in step 300. The process begins with the lowest entry, START ENTRY, step 505. The process then adjusts the gain, pole, and zero to the corresponding values from the table, step 507. In step 800, the process uses an automatic gain control (hereinafter "AGC") process to adjust the gain to yield an average +3 signal value of +3.0.

Figure 7:
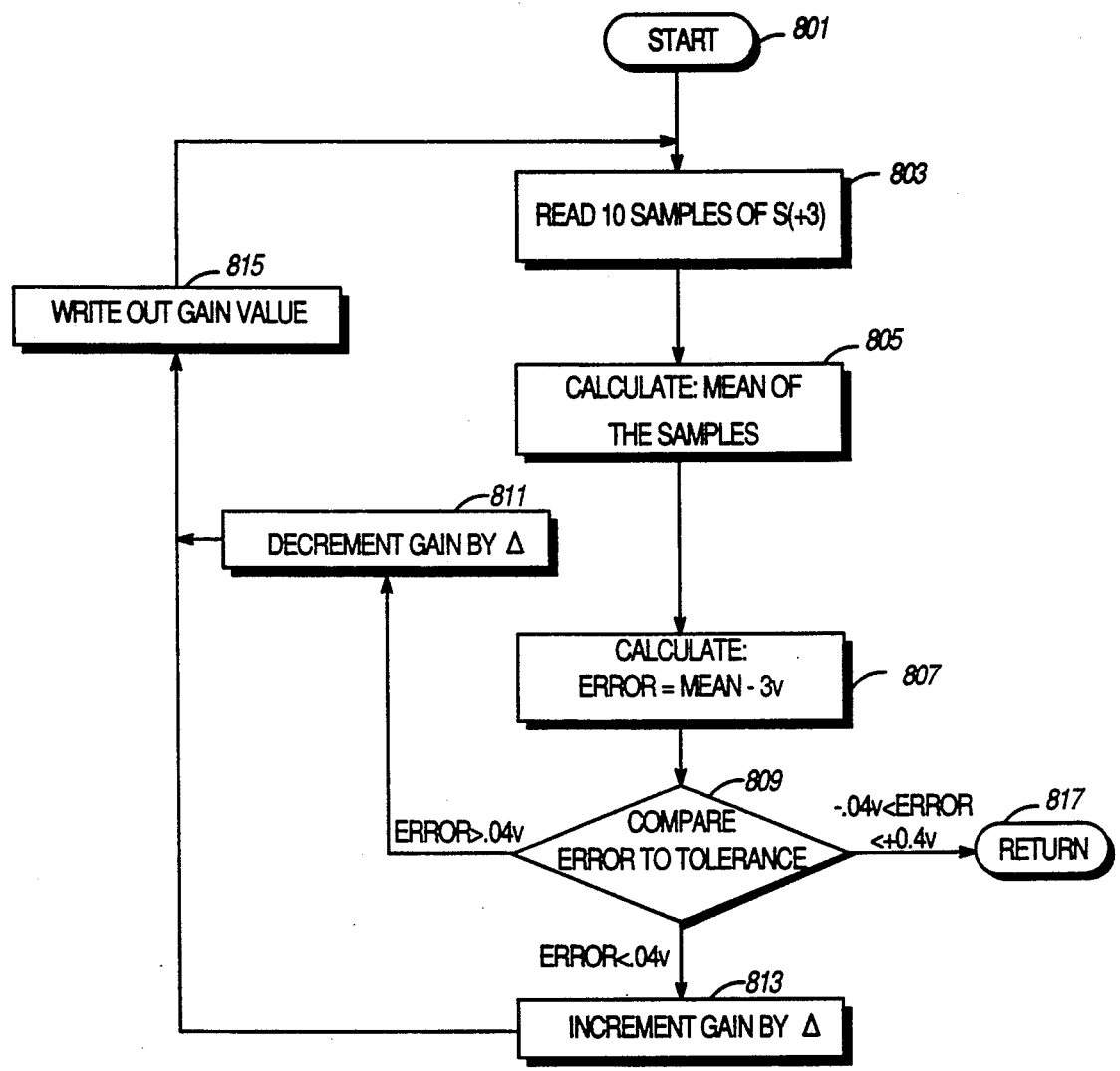

An AGC process which is suitable for use in step 800 is depicted in FIG. 7, as described below.

The variance of the equalized +3 signals is then measured, step 509. The process then goes to step 511.

The remaining steps 511-523 cause the process to sequentially step through each entry until the final entry, STOP ENTRY, is reached. For each entry, a new gain value is computed by step 800, and the variance computed by step 509. Note that steps 519 and 513 cause the minimum variance to be determined and saved as the parameter MIN VARIANCE. Also, steps 519, 513, and 515 cause the gain, pole, and zero values associated with the minimum variance to be saved as the parameter BEST.

When step 521 determines that the final entry, i.e., STOP ENTRY, has been reached, step 523 adjusts the adjustable gain unit and the adjustable filter unit to the values saved as the parameter BEST. The process then goes to FIG. 5 via reference letter B.

FIG. 5 depicts further detail for step 600 (shown in FIG. 2). It must be recalled that steps 501-523 has previously adjusted the adjustable filter unit to a pole value and a zero value which were taken directly from the table. Also, steps 501-523 have previously adjusted the adjustable gain unit to a value calculated by the AGC process, step 800.

Referring now to FIG. 5, steps 601-631 generally act to hold the zero value constant, while adjusting the gain to a value which yields an average value of equalized +3 signals of +3.0 volts, and while adjusting the pole value to a value which minimizes the variance of the equalized +3 signals.

Note the gain is adjusted by the AGC process of step 800.

The process first increments the pole by a predetermined value ($\Delta$), step 601, writes the incremented pole value to the filter, step 603, performs the AGC, step 800, measures the variance, step 605, and then determines if the resulting variance has improved, i.e., has it decreased from the previous value, step 607. If the variance has decreased, then the process goes to steps 609, 611, and 613, and then repeats steps 601-607. Generally, this iteration continues incrementing the pole by a predetermined value (step 601) until step 607 determines that the variance is no longer decreasing with each successive iteration. When this occurs, the process goes to step 631.

Otherwise, if the variance has not decreased, the process concludes that the pole should be decremented instead of incremented, in order to determine the optimum pole value. As a result, the process goes to step 617, and then loops through the remaining steps 619, 800, 621, 623, 625, 627, and 629. Generally, this iteration continues decrementing the pole by a predetermined value (step 629) until step 623 determines that the variance is no longer decreasing with each successive iteration. When this occurs, the process goes to step 631.

Step 631 adjusts the gain and the pole to the values corresponding to the previous iteration. The process then goes to step FIG. 6 via reference letter C.

Figure 6:
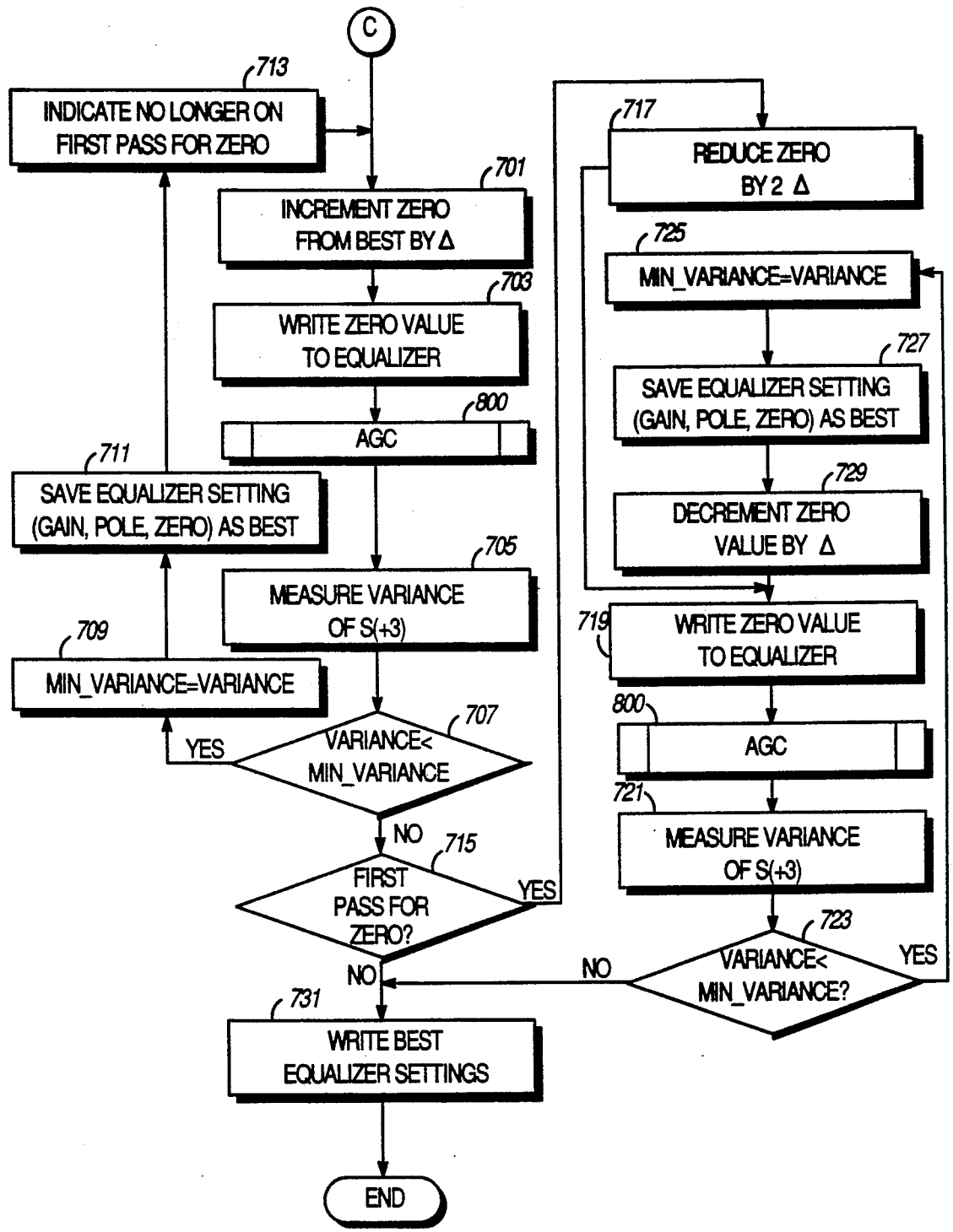

FIG. 6 depicts further detail for step 700 (shown in FIG. 2). It must be recalled that steps 501-523 have adjusted the filter to a zero value from the table. Also, steps 601-631 have has previously adjusted the gain by the AGC process and adjusted the pole to an optimum pole value.

Referring now to FIG. 7, steps 701-731 generally act to hold the pole value constant, while adjusting the gain to a value which yields an average value of equalized +3 signals of +3.0 volts, and while adjusting the zero value to a value which minimizes the variance of the equalized +3 signals.

Note the gain is adjusted by the AGC process of step 800.

The process first increments the zero by a predetermined value ($\Delta$), step 701, writes the incremented zero value to the filter, step 703, performs the AGC, step 800, measures the variance, step 705, and then determines if the resulting variance has improved, i.e., has it decreased from the previous value, step 707. If the variance has decreased, then the process goes to steps 709, 711, and 713, and then repeats steps 701-707. Generally, this iteration continues incrementing the zero by a predetermined value (step 701) until step 707 determines that the variance is no longer decreasing with each successive iteration. When this occurs, the process goes to step 731.

Otherwise, if the variance has not decreased, the process concludes that the zero should be decremented instead of incremented, in order to determine the optimum zero value. As a result, the process goes to step 717, and then loops through the remaining steps 719, 800, 721, 723, 725, 727, and 729. Generally, this iteration continues decrementing the zero by a predetermined value (step 729) until step 723 determines that the variance is no longer decreasing with each successive iteration. When this occurs, the process goes to step 731.

Step 731 adjusts the gain and the zero to the values corresponding to the previous iteration. The process then goes to step end.

FIG. 7 depicts an AGC process that is suitable for use with an adaptive equalizer method and apparatus, in accordance with the invention.

The process starts, step 801, then samples the equalized +3 signals, step 803, and calculates the average value of the equalized +3 signal samples, step 805.

In step 807 the process compares the average value to +3.

In step 809, the process whether the average value is greater than a permitted tolerance, or is less than the permitted tolerance, or is within a permitted tolerance of +3.0.

If the average value is too large, the process goes to steps 811, where the gain is decremented by a predetermined value ($\Delta$). The process then goes to step 815, where the gain unit is adjusted to the new gain value. The process then repeats steps 803-809.

If the average value is too large, the process goes to steps 813, where the gain is decremented by a predetermined value ($\Delta$). The process then goes to step 815, where the gain unit is adjusted to the new gain value. The process then repeats steps 803-809.

If the average value is within tolerance, the process goes to step 817, where the AGC process is complete.

It is believed that the conventional approach to solving the problem addressed by the present invention would be a digital signal processor ("DSP")-based adaptive filter. By comparison, in one embodiment, an adaptive equalizer, in accordance with the present invention, utilizes analog components in the gain unit 107 and the filter unit 111. As a result, the per-unit price is significantly less than would result from a comparable DSP-based unit.

Moreover, an adaptive equalizer, in accordance with the present invention, yields fast performance, without sacrificing versatility. In one embodiment, an equalizer taking full advantage of the teachings of the present invention, as disclosed herein, functioned reliably with over 13,000 feet of 24- and 26 gauge line.

Further, an equalizer taking full advantages of the teachings of the present invention, as disclosed herein, allows non-return-to-zero ("NRZ") signals to be transmitted over a variety of line lengths and types, while offering quick equalization and high adaptability.

Further, an equalizer taking full advantages of the teachings of the present invention, as disclosed herein, does not require a dedicated processor, because it requires a relatively few number of processor cycles to execute the process of FIGS. 2-8.

Based on using digital potentiometers to fine-tune the gain circuit 107 and the filter circuit 111, the ability to delicately fine tune the over-all frequency response of the equalizer 103 may be significantly improved, as compared to the prior art.

While various embodiments of an adaptive equalizer method and apparatus, in accordance with the present invention, have been described hereinabove, the scope of the invention is defined by the following claims.

What is claimed is:

1. In an equalizer, the equalizer comprising an adjustable gain unit having a gain that is adjustable and further comprising an adjustable filter unit having a pole that is adjustable and a zero that is adjustable, the equalizer including an equalizer input and an equalizer output, the equalizer arranged for equalizing a set of received signals including a predetermined signal applied to the equalizer input and for forming an equalized signal at the equalizer output, the equalizer including a processor, the processor coupled to the equalizer output, a method for the processor to adjust the equalizer, the method comprising the steps of:

(a) sample the equalizer output;
    (b) detect a plurality of equalized predetermined signals present at the equalizer output; and,
    (c) adjust the gain, the pole, and the zero so that the average value of the plurality of equalized predetermined signals is substantially equal to a predetermined value (X) and the variance of the plurality of equalized predetermined signals is minimized.

2. The method of claim 1, the processor coupled to the equalizer output by means of a series-connected analog to digital ("A/D") converter.

3. The method of claim 2, the processor arranged to access a memory unit.

4. The method of claim 3, the memory unit including stored data including a plurality (n) of entries ($E_k$), where $k=1,2,3,\ldots,n$, each $E_k$ comprising a predetermined gain value ($G_k$), a predetermined pole value ($P_k$) and a predetermined zero value ($Z_k$).

5. The method of claim 4, where the adjusting step (c) is based on the plurality (n) of entries $E_k$.

6. The method of claim 5, where the adjusting step (c) includes the steps of:

(c1) for each $E_k$, as k varies from $1-n$, adjust the gain to the gain value $G_k$, adjust the pole to the pole value $P_k$, adjust the zero to the zero value $Z_k$, calculate the average value of the plurality of equalized predetermined signals, and then compare the average value to X; and,
    (c2) select the entry $E_j$ which causes the average value of the plurality of equalized predetermined signals to substantially equal X.

7. The method of claim 6, where the adjusting step (c) includes the step of:

(c3) determine when the plurality (n) of entries $E_k$ does not include an entry $E_j$ which causes the average value of the plurality of equalized predetermined signals to substantially equal X.

8. The method of claim 7, where the adjusting step (c) includes the steps of:

(c4) for each entry $E_k$ as k varies above and below j, thus $\ldots, j-2, j-1, j, j+1, j+2, \ldots$, adjust the pole to the pole value $P_k$, adjust the zero to the zero value $Z_k$, adjust the gain to a gain value which causes the average value of the plurality of equalized predetermined signals to substantially equal X, and then calculate the variance of the plurality of equalized predetermined signals; and,
    (c5) select the set of values $G_m$, $P_m$ and $Z_m$ as in step (c4) which minimizes the variance of the plurality of equalized predetermined signals.

9. The method of claim 8, where the adjusting step (c) includes the step of:

(c6) adjust the zero to the zero value $Z_m$ as in step (c5), then adjust the gain to a gain value which causes the average value of the plurality of equalized predetermined signals to substantially equal X and adjust the pole to a pole value which minimizes the variance of the plurality of equalized predetermined signals.

10. The method of claim 9, where the adjusting step (c) includes the step of:

(c7) adjust the gain to a gain value which causes the average value of the plurality of equalized predetermined signals to substantially equal X and adjust the zero to a zero value which minimizes the variance of the plurality of equalized predetermined signals.

11. The method of claim 10, where the adjustable gain unit comprises at least one operational amplifier and at least one multiplying digital to analog ("D/A") converter.

12. The method of claim 11, where the adjustable filter unit comprises at least one operational amplifier and at least one digital potentiometer.

13. The method of claim 12 where where the set of received signals comprises the multi-level signals $S(-3)$, $S(-1)$, $S(+1)$, $S(+3)$ having corresponding signal levels $-3, -1, +1, +3$, respectively.

14. The method of claim 13, where the predetermined signal is $S(+3)$, $X=+3$ volts, the equalizer is a digital data service ("DDS") equalizer, and $n \geq 45$.

15. An equalizer, the equalizer comprising an adjustable gain unit having a gain that is adjustable and further comprising an adjustable filter unit having a pole that is adjustable and a zero that is adjustable, the equalizer including an equalizer input and an equalizer output, the equalizer arranged for equalizing a set of received signals including a predetermined signal applied to the equalizer input and for forming an equalized signal at the equalizer output, the equalizer including a processor, the processor coupled to the equalizer output, the processor programmed for adjusting the equalizer in accordance with a predetermined method, the predetermined method comprising the steps of:

(a) sample the equalizer output;

(b) detect a plurality of equalized predetermined signals present at the equalizer output; and, (c) adjust the gain, the pole, and the zero so that the average value of the plurality of equalized predetermined signals is substantially equal to a predetermined value (X) and the variance of the plurality of equalized predetermined signals is minimized.

16. The equalizer of claim 15, the processor coupled to the equalizer output by means of a series-connected analog to digital ("A/D") converter.

17. The equalizer of claim 16, the processor arranged to access a memory unit.

18. The equalizer of claim 17, the memory unit including stored data including a plurality (n) of entries ($E_k$), where $k=1, 2, 3, \ldots, n$, each $E_k$ comprising a predetermined gain value ($G_k$), a predetermined pole value ($P_k$) and a predetermined zero value ($Z_k$).

19. The equalizer of claim 18, where the adjusting step (c) is based on the plurality (n) of entries $E_k$.

20. The equalizer of claim 19, where the adjusting step (c) includes the steps of:

(c1) for each $E_k$, as k varies from 1-n, adjust the gain to the gain value $G_k$, adjust the pole to the pole value $P_k$, adjust the zero to the zero value $Z_k$, calculate the average value of the plurality of equalized predetermined signals, and then compare the average value to X; and, (c2) select the entry $E_j$ which causes the average value of the plurality of equalized predetermined signals to substantially equal X.

21. The equalizer of claim 20, where the adjusting step (c) includes the step of:

(c3) determine when the plurality (n) of entries $E_k$ does not include an entry $E_j$ which causes the average value of the plurality of equalized predetermined signals to substantially equal X.

22. The equalizer of claim 21, where the adjusting step (c) includes the steps of:

(c4) for each entry $E_k$ as k varies above and below j, thus $\ldots, j-2, j-1, j, j+1, j+2, \ldots$, adjust the pole to the pole value $P_k$, adjust the zero to the zero value $Z_k$, adjust the gain to a gain value which causes the average value of the plurality of equalized predetermined signals to substantially equal X, and then calculate the variance of the plurality of equalized predetermined signals; and, (c5) select the set of values $G_m$, $P_m$ and $Z_m$ as in step (c4) which minimizes the variance of the plurality of equalized predetermined signals.

23. The equalizer of claim 22, where the adjusting step (c) includes the step of:

(c6) adjust the zero to the zero value $Z_m$ as in step (c5), then adjust the gain to a gain value which causes the average value of the plurality of equalized predetermined signals to substantially equal X and adjust the pole to a pole value which minimizes the variance of the plurality of equalized predetermined signals.

24. The equalizer of claim 23, where the adjusting step (c) includes the step of:

(c7) adjust the gain to a gain value which causes the average value of the plurality of equalized predetermined signals to substantially equal X and adjust the zero to a zero value which minimizes the variance of the plurality of equalized predetermined signals.

25. The equalizer of claim 24, where the adjustable gain unit comprises at least one operational amplifier and at least one multiplying digital to analog ("D/A") converter.

26. The equalizer of claim 25, where the adjustable filter unit comprises at least one operational amplifier and at least one digital potentiometer.

27. The equalizer of claim 26 where the set of received signals comprises the multi-level signals ($S(-3)$, $S(-1)$, $S(+1)$, $S(+3)$ having corresponding signal levels $-3, -1, +1, +3$, respectively.

28. The equalizer of claim 27, where the predetermined signal is $S(+3)$, $X=+3$ volts, the equalizer is a digital data service ("DDS") equalizer, and $n \geq 45$.

* * * * *

UNITED STATES PATENT AND TRADEMARK OFFICE
CERTIFICATE OF CORRECTION

PATENT NO. : 5,245,556

DATED : September 14, 1993

INVENTOR(S) : Jason N. Morgan and Harold A. Vaghy

It is certified that error appears in the above-identified patent and that said Letters Patent is hereby corrected as shown below:

At column 9, line 26, "claim 12 where where the set" should be --claim 12 where the set--.

At column 10, line 58, "(S(-3)," should be --S(-3),--.

Signed and Sealed this

Fifth Day of April, 1994

Attest:

BRUCE LEHMAN

*Attesting Officer*   *Commissioner of Patents and Trademarks*